United States Patent
Kato

(10) Patent No.: US 9,297,667 B2
(45) Date of Patent: Mar. 29, 2016

(54) MAP DISPLAY APPARATUS AND NAVIGATION SYSTEM

(71) Applicant: DENSO CORPORATION, Kariya, Aichi-pref. (JP)

(72) Inventor: Noriko Kato, Toyoake (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/396,115

(22) PCT Filed: Apr. 22, 2013

(86) PCT No.: PCT/JP2013/002689
§ 371 (c)(1),
(2) Date: Oct. 22, 2014

(87) PCT Pub. No.: WO2013/168374
PCT Pub. Date: Nov. 14, 2013

(65) Prior Publication Data
US 2015/0088415 A1    Mar. 26, 2015

(30) Foreign Application Priority Data

May 11, 2012    (JP) .................................. 2012-109786

(51) Int. Cl.
*G01C 21/00* (2006.01)
*G08G 1/123* (2006.01)
*G01C 21/36* (2006.01)
*G06F 17/30* (2006.01)

(52) U.S. Cl.
CPC .......... *G01C 21/367* (2013.01); *G01C 21/3673* (2013.01); *G06F 17/30241* (2013.01)

(58) Field of Classification Search
CPC ... G10L 15/22; G10L 15/26; G10L 2015/228; G10L 21/06; G01C 21/3608; G01C 21/3679
USPC ............................ 701/400–541; 340/988–996
See application file for complete search history.

(56) References Cited

U.S. PATENT DOCUMENTS

| | | | |
|---|---|---|---|
| 6,333,702 B1 | 12/2001 | Hiyokawa et al. | |
| 6,629,069 B1 * | 9/2003 | Attwater | G10L 15/26 704/231 |
| 8,548,732 B2 * | 10/2013 | Tsuji | G01C 21/3673 340/995.1 |
| 2008/0306684 A1 * | 12/2008 | Yamazaki | G01C 21/3673 701/532 |

FOREIGN PATENT DOCUMENTS

| | | |
|---|---|---|
| JP | 07-301542 A | 11/1995 |
| JP | 08-35850 A | 2/1996 |
| JP | 2004-184330 A | 7/2004 |
| JP | 2007-139526 A | 6/2007 |

OTHER PUBLICATIONS

International Search Report and Written Opinion of the International Searching Authority mailed Aug. 6, 2013 for the corresponding International application No. PCT/JP2013/002689 (and English translation).

* cited by examiner

*Primary Examiner* — Muhammad Shafi
(74) *Attorney, Agent, or Firm* — Posz Law Group, PLC

(57) ABSTRACT

When a search condition is supplied, a road name drawing process acquires a target road name corresponding to a search target spot. The road name drawing process searches a plurality of display map datasets for character data corresponding to a plurality of scales and acquires a scale for a display map dataset whose character data contains the corresponding target road name. The road name drawing process performs a map drawing process using that scale. Namely, the process draws a map containing the search target spot so as to display the target road name corresponding to the search target spot. For this purpose, the process previously searches a plurality of display map datasets for character data and uses the display map dataset whose scale allows the character data to contain the target road name.

22 Claims, 9 Drawing Sheets

(a) DRAW BACKGROUND - PARK H, BUILDING I, RIVER J (b) DRAW ROADS - ORDINARY ROAD K, SUPERHWY L (c) DRAW CHARACTERS - INDICATED BY M, N, O (a) MAP DISPLAY CORRESPONDING TO SEARCH TARGET SPOT X (b) MAP DRAWN USING SCALE WITH ROAD NAME

MAP DISPLAY APPARATUS AND NAVIGATION SYSTEM

CROSS REFERENCE TO RELATED APPLICATION

The present disclosure is a U.S. national stage application of PCT/JP2013/002689 filed on Apr. 22, 2013 and is based on Japanese Patent Application No. 2012-109786 filed on May 11, 2012, the disclosures of which are incorporated herein by reference.

TECHNICAL FIELD

The present disclosure relates to a map display apparatus and a navigation system to display road names corresponding to roads on a map.

BACKGROUND ART

Generally, a navigation system includes a map display apparatus. The map display apparatus displays a necessary map on a display portion such as a display unit and displays the current vehicle position overlapping with the map to provide the guidance.

Therefore, the navigation system stores display map data to display the map. The display map data includes background data to draw buildings or landforms, road data to draw roads, and character data to draw names of buildings or roads.

Drawing characters using the character data allows a user to confirm facility names, enabling to provide proper guidance. Recently, various proposals are made to draw characters using character data. For example, a proposed apparatus prioritizes character data to prevent drawn characters from overlapping and draws a character based on highly prioritized character data if display positions overlap (e.g., see Patent Literature 1).

PRIOR ART LITERATURES

Patent Literature

Patent Literature 1: JP H07-301542 A

SUMMARY OF INVENTION

The navigation system uses a search function to settle a destination. It is favorable to display a road name corresponding to a search target spot on the map displayed as a search result. This is because displaying the road name can notify a user that the search result is valid. As a result, the user can feel a sense of ease.

However, as described in Patent Literature 1, providing priorities uniformly may not display a road name for a road corresponding to the search target spot. In this case, a user may change the map scale to display the road name and determine whether the search result is valid.

The present disclosure has been made in consideration of the foregoing. It is, therefore, an object of the present disclosure to provide a map display apparatus and a navigation system having the map display apparatus capable of displaying a road name appropriate for a road corresponding to a search target spot.

To achieve the above-mentioned object, a map display apparatus according to an aspect of the present disclosure includes a storage portion and a control circuit. The storage portion stores a plurality of display map datasets containing data as drawing targets. The display map dataset is provided for each map display scale. The control circuit draws a map containing the search target spot based on the display map dataset stored in the storage portion.

Particularly in the control circuit, a road information acquisition section acquires road information to specify a target road name corresponding to the search target spot. The road information is acquired according to a search condition or a search result to be described later.

A determination section determines whether character data in the display map dataset contains the target road name specified by the road information acquired by the road information acquisition section. A drawing section then draws a map containing the search target spot. In this case, the drawing section uses, from among the plurality of display map datasets, a display map dataset whose scale allows the character data to contain the target road name.

According to a conventional technology, a user may need to change a map scale to display a target road name if a map is displayed as a search result but does not contain the target road name corresponding to a search target spot.

To draw a map containing a search target spot, the map display apparatus according to the aspect previously searches display map datasets for character data so as to display a target road name corresponding to the search target spot and uses a display map dataset whose scale allows character data to contain the target road name. This makes it possible to display the target road name appropriate for the road corresponding to the search target spot.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

The following will explain an embodiment of the present disclosure with reference to the accompanying drawings.

Figure 1:
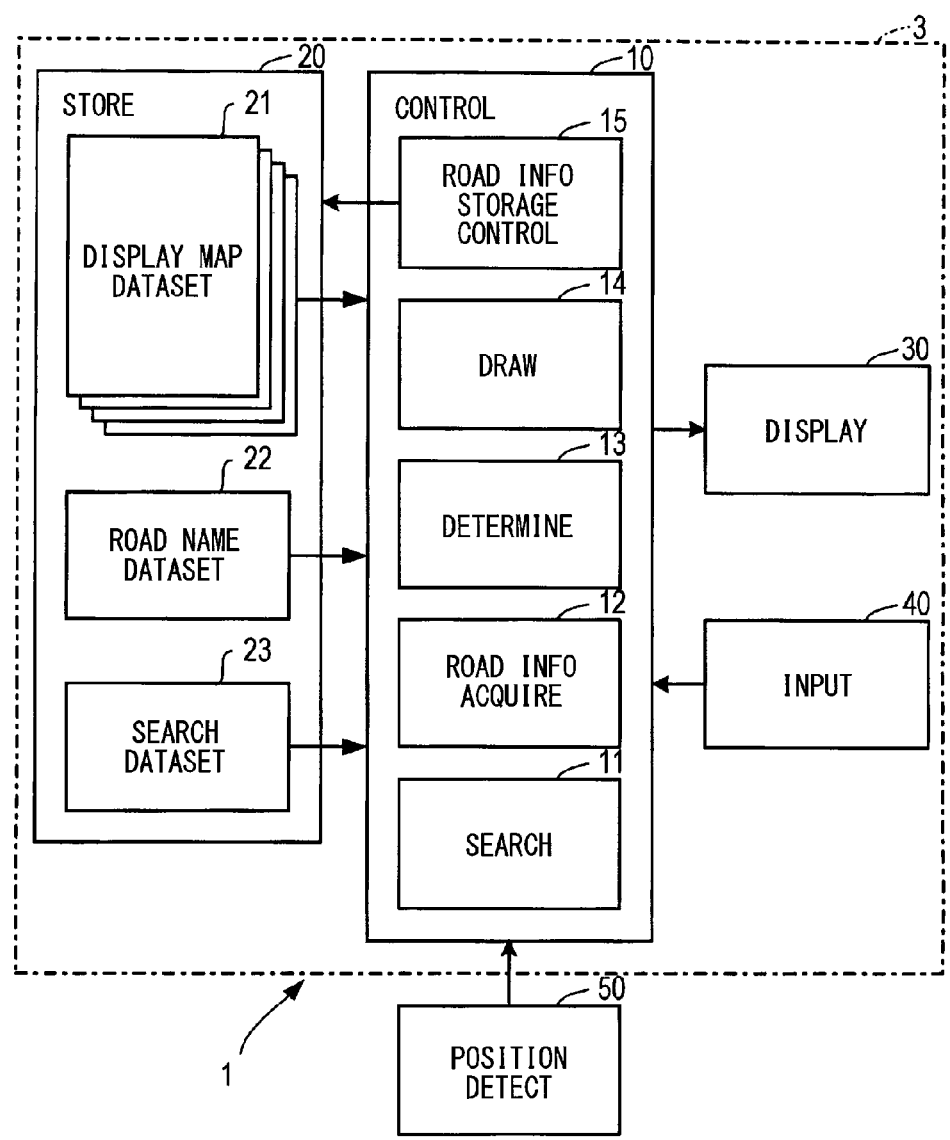
FIG. 1 is a block diagram illustrating a schematic configuration of a navigation system.

As illustrated in FIG. 1, a navigation system 1 according to the present embodiment includes a map display apparatus 3. The map display apparatus 3 includes a control circuit 10, a storage portion 20, a display portion 30, and an input portion 40.

It is noted that in the present application, "information" may be used as being countable as well as uncountable.

The control circuit 10 is provided as a computer and includes a CPU, ROM, RAM, an I/O unit, and a bus line to connect the components.

The storage portion 20 is embodied as an HDD (hard disk drive) for example and stores various types of data. The storage portion 20 is not limited to the HDD and may be available as a storage apparatus that ensures storages contents even if the power is removed.

Various types of data include a plurality of display map datasets 21, road name datasets 22, and search datasets 23.

Figure 2:
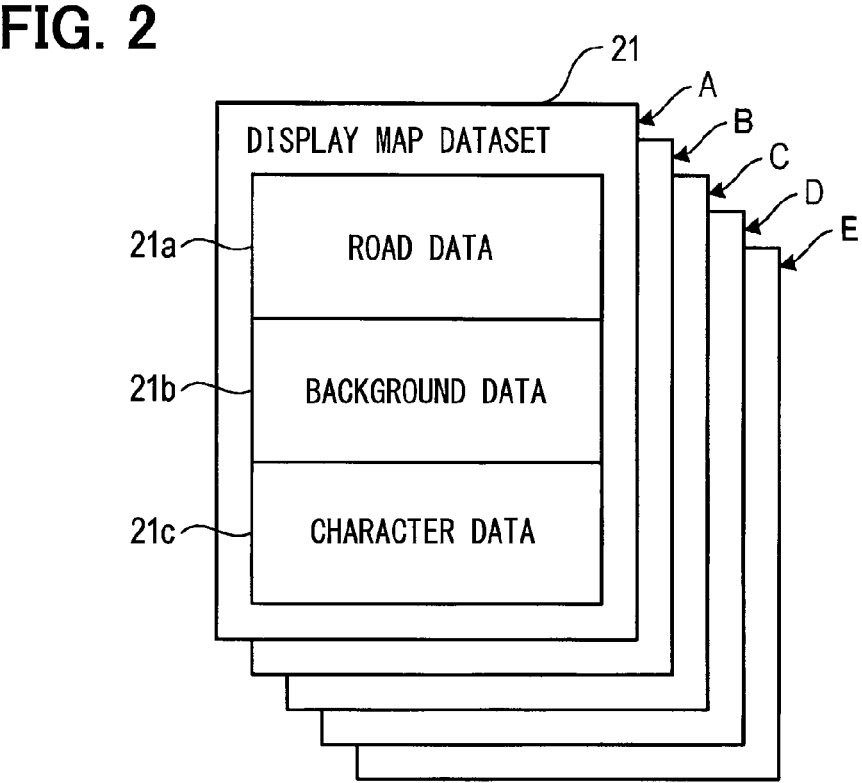
FIG. 2 is an explanatory diagram illustrating a data structure of a display map dataset.

The display map datasets 21 supply data to draw maps and are provided as one-to-one corresponding to map scales. As illustrated in FIG. 2, for example, a plurality of display map datasets 21 are provided to include display map databases 21A through 21E that correspond to a plurality of scales on a one-to-one basis. That is, the display map dataset 21A supplies data for a scale of 1:2,560,000. The display map dataset 21B supplies data for a scale of 1:1,280,000. The display map dataset 21C supplies data for a scale of 1:320,000. The display map dataset 21D supplies data for a scale of 1:80,000. The display map dataset 21E supplies data for a scale of 1:20,000. These are mere examples. It is possible to appropriately change the number of scales or determine various scale sizes of data.

The display map datasets 21 are provided correspondingly to various scales, enabling a map to be displayed by stepwise changing the scales from wide-area display mode to detailed display mode. To display roads, for example, the wide-area display mode displays only intercity expressways. The detailed display mode displays national roads, prefectural roads and major local roads, and arterial roads and ordinary roads each time the scale is changed.

As illustrated in FIG. 2, road data 21a in each display map dataset 21 represents a road to be displayed according to each scale. The display map dataset 21 also contains background data 21b and character data 21c as well as the road data 21a. The background data 21b is used to draw landforms (such as green spaces and water areas) or buildings. The character data 21c is used to draw characters such as road names on the map. The road data 21a and the background data 21b contain coordinates that generate line drawings. In contrast, the character data 21c supplies text data. The character data 21c is not provided for all roads specified by the road data 21a. No road names may be displayed for the roads drawn based on the road data 21a. The purpose is to prevent drawn characters from overlapping, for example.

According to the present embodiment, as illustrated in FIG. 1, the storage portion 20 stores the road name dataset 22. The road name dataset 22 stores all road names corresponding to the road data 21a in the display map datasets 21. When a road name corresponding to the search target spot is known, searching for the road name dataset 22 can specify data for the corresponding road in the road data 21a even if the character data 21c does not include the road name.

Returning back to FIG. 1, the search dataset 23 supplies data to search for a spot based on a search condition that is supplied to settle a destination.

The display portion 30 is provided as a display unit and is embodied as a color liquid crystal display. The display portion 30 displays a map.

The input portion 40 allows a user to enter information and includes mechanical button switches and a touch panel integrated with the display portion 30. The user can enter search conditions using the input portion 40.

The navigation system 1 includes a position detection portion 50 connected to the control circuit 10.

The position detection portion 50 includes various sensors such as a GPS (Global Positioning System) receiver to specify a current vehicle position. The control circuit 10 specifies the current vehicle position on the map based on a signal from the position detection portion 50. The control circuit 10 searches for a route and provides guidance based on the searched route.

Figure 3:
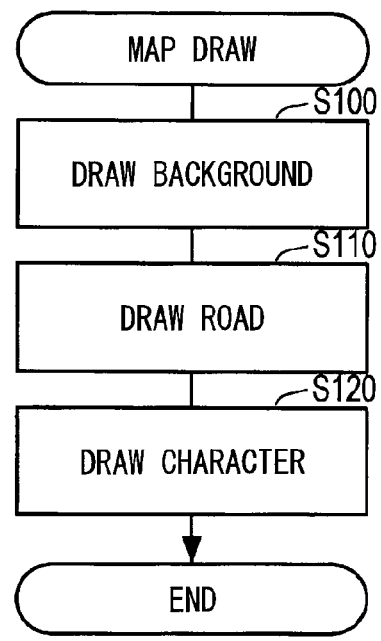
FIG. 3 is a flowchart illustrating a map drawing process.
Figure 4:
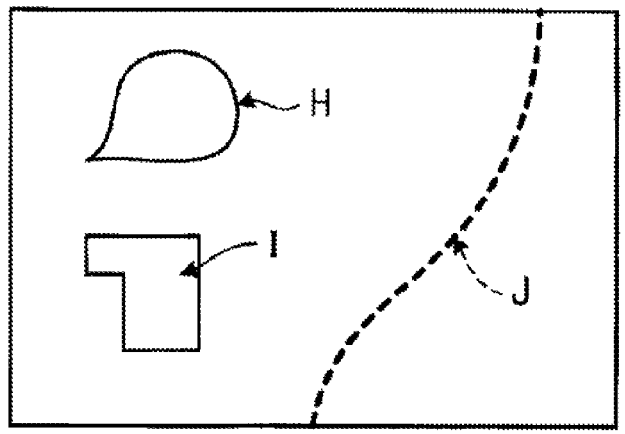
FIG. 4 is an explanatory diagram illustrating a map drawing example.
Figure 4:
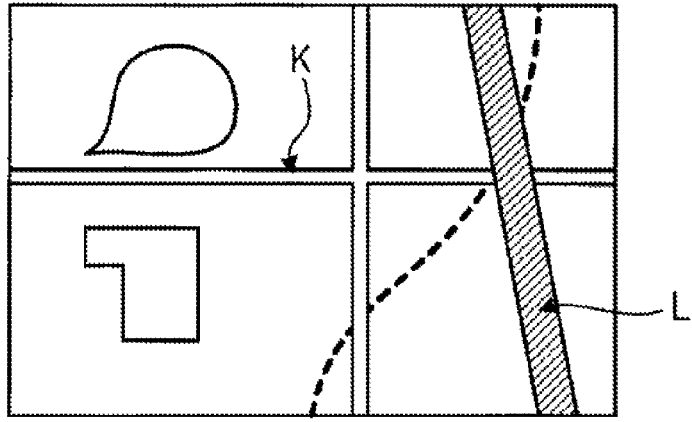
Figure 4:
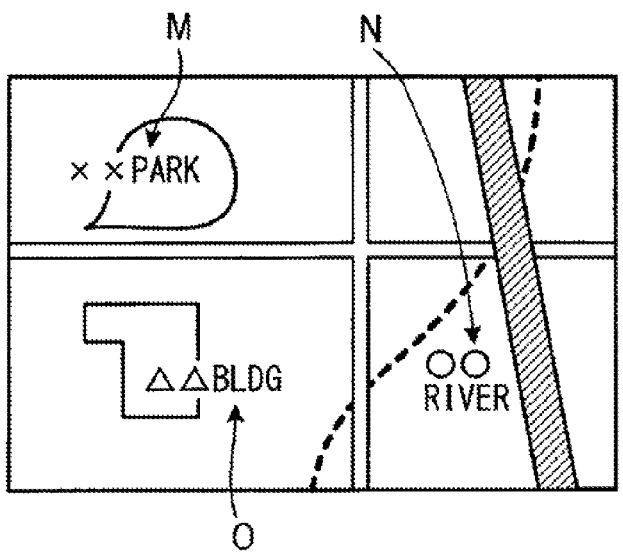

A map drawing process will be described with reference to FIGS. 3 and 4. The map drawing process draws a map based on the display map dataset 21 corresponding to a specified scale and functions as a subroutine executed from a road name drawing process and a scale change process to be described later. The map drawing process is embodied as a function of a drawing section 14 in the control circuit 10.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

At S100, the map drawing process draws a background. This process draws a background based on the background data 21b in the display map dataset 21. As described above, the background data 21b includes coordinates that can generate line drawings. Specifically, as illustrated in FIG. 4(a), the process draws landforms and buildings such as park H, building I, and river J.

At S110, the map drawing process draws a road. This process draws a road based on the road data 21a in the display map dataset 21. As described above, the road data 21a includes coordinates that can generate line drawings. Specifically, as illustrated in FIG. 4(b), the process draws roads such as ordinary road K and superhighway L in addition to the background.

At S120, the map drawing process draws a character. This process draws a character based on the character data 21c in the display map dataset 21. Specifically, the process draws characters such as "xx PARK," "oo RIVER," and "ΔΔ BLDG" indicated by symbols M, N, and O in FIG. 4(c).

A search process will be described with reference to FIG. 5. The search process precedes a process to display a search target spot on the map. The search process is embodied as a function of a search section 11 in the control circuit 10.

At S200, the search process determines whether a search condition is supplied. This process determines whether the user supplies a search condition using the input portion 40. For example, the process determines whether a search word is supplied as a search condition. The search process may determine that a search condition is supplied (YES at S200). In this case, the search process proceeds to S210. The search process may determine that no search condition is supplied (NO at S200). In this case, the search process terminates without further process.

At S210, the search process searches the search dataset 23. This process searches the search dataset 23 in the storage portion 20 illustrated in FIG. 1. Data that matches the search condition is displayed as a search result at S220. The search result is displayed in a list format, for example. The user selects the search result from the list. The search result includes a search target spot. The search process then displays a map including the search target spot. When the user selects the search result displayed in the list form, a road name drawing process is then performed.

The road name drawing process will be described with reference to FIG. 6.

At S300, the road name drawing process acquires road information, namely, a road name corresponding to the search target spot. The road name corresponding to the search target spot may be included in the information supplied as the search condition, for example. Specifically, the road name may be included in the address as a search condition. As another example, the road name may be included in the information as the search result. Specifically, the road name may be specified from the address included in the information about a facility when the search target spot signifies "facility." This process is implemented as a function of a road information acquisition section 12 in the control circuit 10.

At S310, the road name drawing process searches the display map dataset 21 for the character data 21c. This process searches the character data 21c in the display map datasets 21 for the road name acquired at S300.

At S320, the road name drawing process determines whether the character data 21c contains the road name. If determining that the character data 21c contains the road name (YES at S320), the road name drawing process proceeds to S330 and acquires a scale for the display map dataset 21 containing the road name. At S340, the road name drawing process performs the map drawing process using the scale and then terminates. If the road name is contained in the character data 21c based on a given scale, performing the map drawing process using the scale (S340) draws the road name. If determining that the character data 21c does not contain the road name (NO at S320), the road name drawing process proceeds to S350.

The process at S310 and S320 corresponds to a function of a determination section 13 in the control circuit 10. The process at S330 and S340 corresponds to a function of the drawing section 14 in the control circuit 10.

At S350, the road name drawing process searches the road name dataset 22. The road name dataset 22 also contains a road name not contained in the character data 21c. The road name is associated with the road data 21a in the display map dataset 21. If the road data 21a contains a link ID, for example, the link ID is associated with the road name.

At S360, the road name drawing process specifies data for the road corresponding to the road name in the display map dataset 21. This process specifies the road having the road name corresponding to the search target spot.

At S370, the road name drawing process acquires a scale for the display map dataset 21. This process acquires a scale for the display map dataset 21 containing data for the road specified at S360.

At S380, the road name drawing process performs the map drawing process. This process performs drawing based on the display map dataset 21 having the scale acquired at S370. This draws the road whose name is to be displayed.

At S390, the road name drawing process draws the road name. The process additionally draws the road name so as to independently overlap the map containing a road whose name is drawn but is not contained in the character data 21c. The process draws the road name associated with the road whose name is to be displayed.

The present embodiment additionally draws road names so as to independently overlap with each other according to a display style similar to that used to draw the road name based on the character data 21c. Specifically, the display style is comparable to a display mode or a display form and signifies the font type, size, color, or the like. The font type, size, color, or the like is configured to equal that based on the character data 21c. This makes it impossible to seemingly distinguish whether a road name is drawn based on the character data 21c or by independently adding it.

The road name may be independently displayed so as to overlap the road or near the road, for example. The road name may be displayed near the search target spot for the road so that the user can easily recognize the road name.

The process at S350 through S390 corresponds to a function of the drawing section 14 in the control circuit 10.

Figure 7:
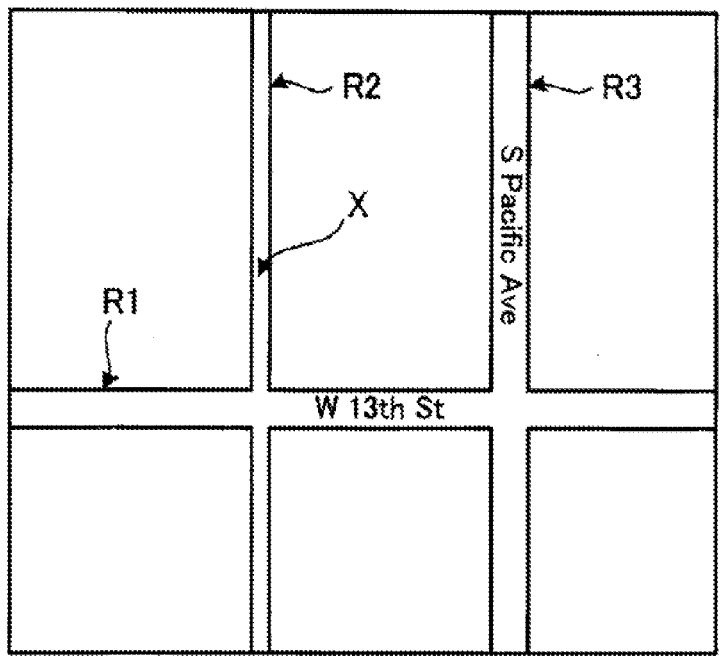
FIG. 7 is an explanatory diagram illustrating an example of displaying road names.
Figure 7:
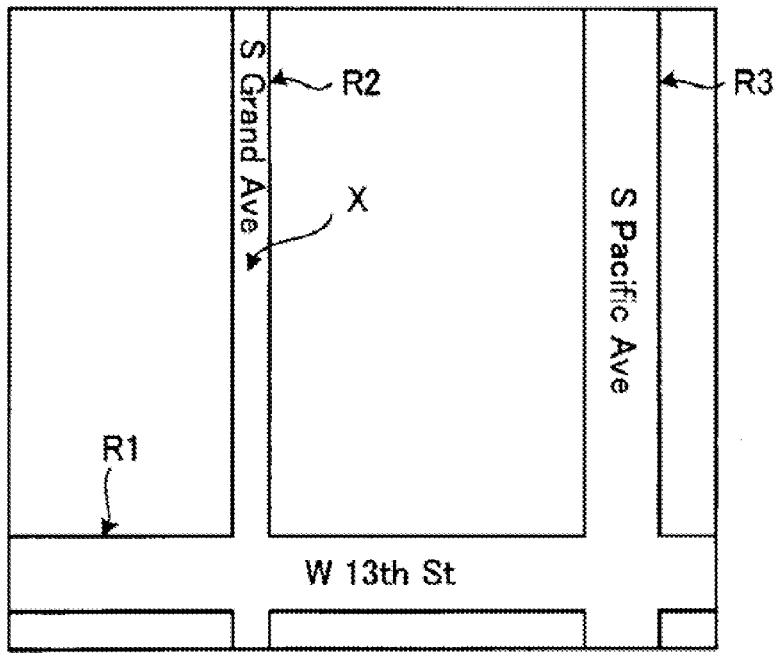

The following describes a case of drawing three roads R1, R2, and R3 on the map as illustrated in FIG. 7.

When a map is displayed corresponding to search target spot X as illustrated in FIG. 7(a), a road name corresponding to search target spot X may not be displayed though road R1 is displayed as "W 13th St" and road R3 is displayed as "S Pacific Ave." In such a case, the user may feel uneasy about whether the displayed map contains search target spot X to be displayed. In such a case, the user may need to change the scale to the detailed display to display road name "S Grand Ave" for road R2 as illustrated in FIG. 7(b).

Figure 5:
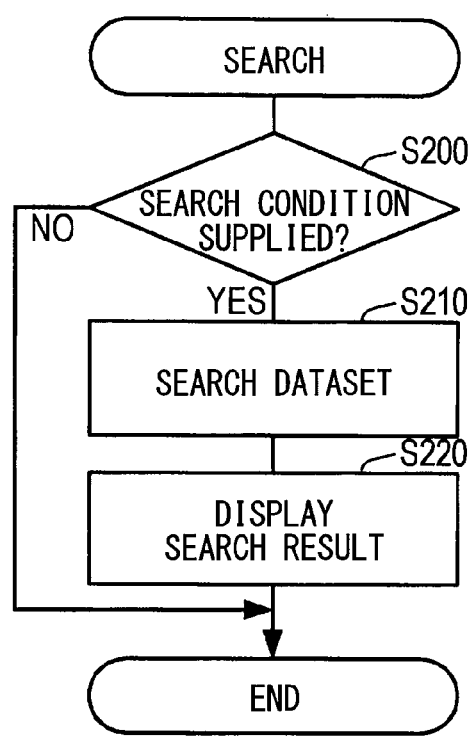
FIG. 5 is a flowchart illustrating a search process.

For example, the search condition may be supplied as "S Grand Ave, Los Angeles, Calif." (YES at S200 in FIG. 5). The process acquires the road information, namely, road name "S Grand Ave" corresponding to search target spot X (S300 in FIG. 6). The process searches the display map dataset 21 for the character data 21c (S310). The process acquires a scale for the display map dataset 21 whose character data 21c contains the corresponding road name (YES at S320 and S330). The map drawing process is performed based on the scale (S340). The process draws the map using the scale that displays road name "S Grand Ave" of road R2 from the beginning as illustrated in FIG. 7(b).

Figure 6:
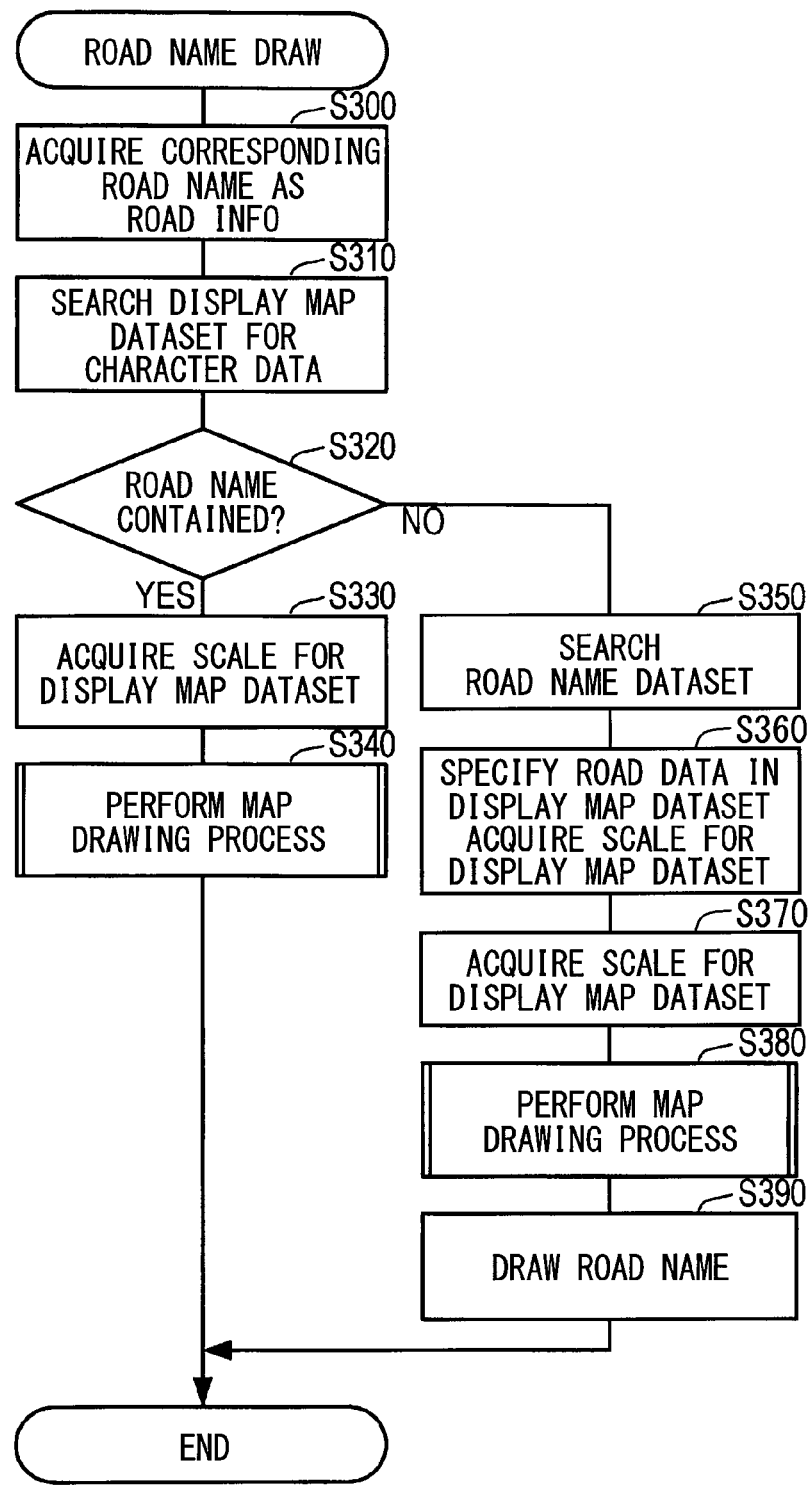
FIG. 6 is a flowchart illustrating a road name drawing process.

The character data 21c in the display map dataset 21 may not contain road name "S Grand Ave" corresponding to the search target spot (NO at S320 in FIG. 6). In such a case, the road name drawing process searches the road name dataset 22 (S350). The process thereby specifies data for the road corresponding to road name "S Grand Ave" (S360) and acquires a scale for the display map dataset 21 containing the data for the specified road (S370). The scale is used to perform the map drawing process (S380). This draws the road corresponding to the road name to be displayed. In this case, the process independently displays the road name corresponding to the road so as to additionally overlap the drawn map (S390). If the character data 21c does not contain the road name, the process draws the road name by individually adding it corresponding to road R2 as illustrated in FIG. 7(a), for example.

A scale change process will be described with reference to FIG. 8. The scale change process displays a road name as much as possible even if the map scale is changed after the road name corresponding to the search target spot is displayed. The scale change process is repeatedly performed after the road name drawing process is performed.

At S400, the scale change process determines whether the scale is changed. If determining that the scale is changed (YES at S400), the scale change process proceeds to S410. If determining that the scale is not changed (NO at S400), the scale change process terminates without further process.

At S410, the scale change process acquires a scale for the display map dataset 21. This process acquires a scale for the display map dataset 21 after the scale is changed.

At S420, the scale change process searches for a road name. This process searches the character data 21c in the display map dataset 21 after the scale change for the road name corresponding to the search target spot.

At S430, the scale change process determines whether the search result contains the road name. Based on the search result at S420, this process determines whether the character data 21c in the display map dataset 21 after the scale change contains the road name. If determining that the road name is contained (YES at S430), the scale change process proceeds to S440 to perform the map drawing process. The scale change process then terminates. The map drawing process draws the road name based on the character data 21c. If determining that the road name is not contained (NO at S430), the scale change process proceeds to S450.

At S450, the scale change process searches the road data 21a. A result of the road name drawing process specifies the road corresponding to the road name as data. The process then searches the road data 21a in the display map dataset 21 after the scale change for data indicative of the road corresponding to the road name.

At S460, the scale change process determines whether the road data 21a contains data for the road. This process determines whether the road data 21a in the display map dataset 21 after the scale change contains data for the road corresponding to the road name according to the search result at S450. If determining that data for the road is available (YES at S460), the scale change process proceeds to S470. If determining that data for the road is unavailable (NO at S460), the scale change process proceeds to S440 to perform the map drawing process because there is no road whose name is to be drawn. The scale change process then terminates. No road name is drawn.

At S470, the scale change process specifies a road corresponding to data for the road.

At S480, the scale change process performs the map drawing process. This process performs drawing based on the display map dataset 21 after the scale change. This draws a road whose name is to be displayed.

At S490, the scale change process draws the road name. The process draws the road name by independently adding a road name not contained in the character data 21c so as to overlap the map to be drawn. The process draws the road name corresponding to the road whose name is to be displayed. Similarly to the road name drawing process, the scale change process draws road names according to a display style similar to that used to draw the road name based on the character data 21c.

A specific description will be added with reference to FIG. 7.

FIG. 7(b) illustrates the map that is drawn according to the scale to display road name "S Grand Ave" for road R2. Under this condition, the following example changes the scale to display a wider area. For example, the scale is changed to that used for FIG. 7(a).

Figure 8:
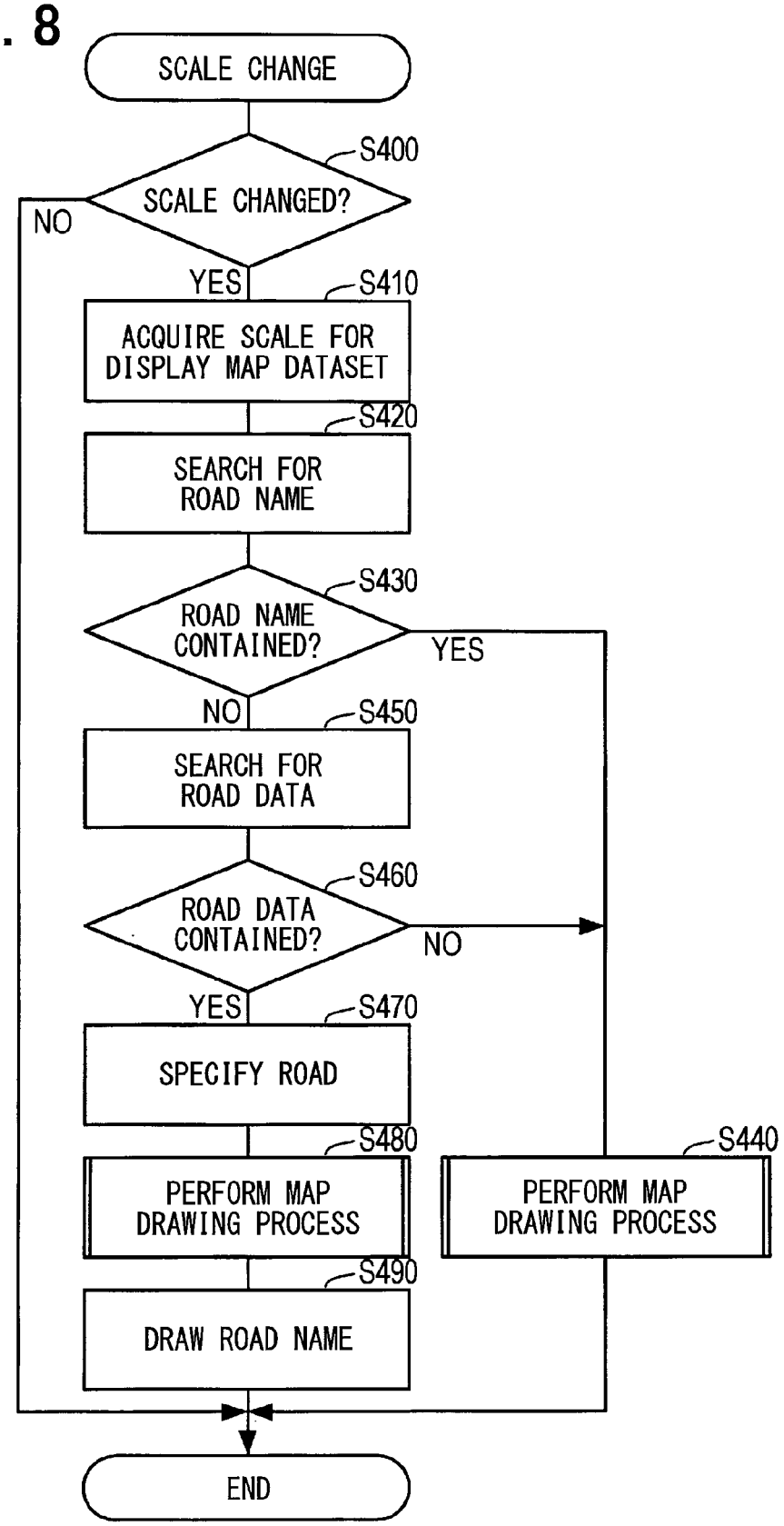
FIG. 8 is a flowchart illustrating a scale change process.

The scale change process searches the character data 21c in the display map dataset 21 after the scale change (S410 and S420 in FIG. 8). If the character data 21c does not contain the road name (NO at S430), the scale change process searches the road data 21a for data corresponding to road R2 (S450). If data for road R2 is available (YES at S460), the scale change process specifies road R2 according to the data (S470), and performs the map drawing process to draw road R2 (S480). The scale change process independently draws the road name corresponding to road R2 so as to additionally overlap the map to be drawn (S490).

According to the example in FIG. 7(a), the character data 21c does not contain road name "S Grand Ave" for road R2. If the character data 21c contains road name "S Grand Ave" (S410, S420, and YES at S430 in FIG. 8), the scale change process performs the map drawing process (S440) to draw the road name based on the character data 21c.

No road data may be available for road R2 (S450 and NO at S460 in FIG. 8). Namely, road R2 itself may not be displayed. In this case, the scale change process just performs the map drawing process (S440).

The process at S420, S430, S450, and S460 corresponds to a function of the determination section 13 in the control circuit 10. The process at S440 and S470 through S490 corresponds to a function of the drawing section 14 in the control circuit 10.

The present embodiment draws a road name drawn in the past under a specified condition as well as a road name corresponding to the most recently retrieved search target spot. A road information storage process and a road name redrawing process will be described with reference to FIGS. 9 and 10.

Figure 9:
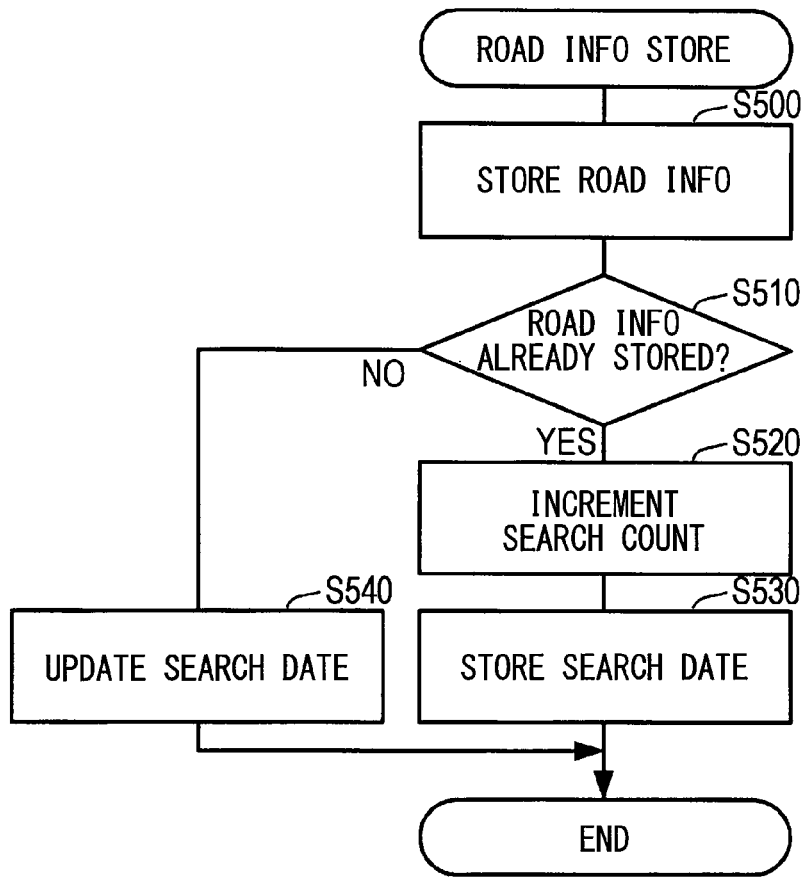
FIG. 9 is a flowchart illustrating a road information storage process.

At S500 in FIG. 9, the road information storage process stores road information. The road information is capable of specifying a road name as a drawing target and may represent the road name itself. The road information may provide road data (e.g., link ID) under the condition that the road name dataset 22 is used to specify a road name.

At S510, the road information storage process determines whether the road information is already stored. This is because the road information storage process may already store the road information corresponding to the road name that is assumed to be a drawing target as a result of repeated search. If determined that the road information is already stored (YES at S510), the road information storage process increments the search count at S520, updates the search date at S530, and then terminates. If determined that no road information is stored (NO at S510), the road information storage process stores the search date at S540 and then terminates.

The road whose name was assumed to be a drawing target in the past is stored in association with the corresponding road information, the search count, and the most recent search date.

The road information storage process corresponds to a function of a road information storage control section 15 in the control circuit 10. While the present embodiment stores the road information, another embodiment may flag data corresponding to the road name that is contained in the road name dataset 22 and was assumed to be a drawing target.

The road name redrawing process will be described with reference to FIG. 10.

At S600, the road name redrawing process reads the road information, the search count, and the search date. This process corresponds to the road information storage process in FIG. 9. The process at S600 corresponds to a function of the road information acquisition section 12 in the control circuit 10.

At S610, the road name redrawing process determines whether the search count is greater than or equal to n and is smaller than or equal to N. The road name redrawing process assumes the road name to be a draw target if the search count is greater than or equal to n. Namely, the road name redrawing process preferentially displays the road name corresponding to a place interested in the past. However, the road name redrawing process does not assume the road name to be a drawing target if the search count exceeds N because the road is highly likely to be already known. If the search count is greater than or equal to n and is smaller than or equal to N (YES at S610), the road name redrawing process identifies the road name as a drawing target at S620, performs a redrawing process at S630, and then proceeds to S640. The redrawing process at S630 draws the road name as a drawing target and is performed similarly to S410 through S490 of the scale change process as illustrated in FIG. 8. If the search count is smaller than n or is greater than N (NO at S610), the road name redrawing process skips S620 and S630 and proceeds to S640.

At S640, the road name redrawing process determines whether the search date is recent. For example, the "recent search date" may signify the road information retrieved within a specified period (e.g., one month) in the past. Alternatively, the "recent search date" may signify the road information that belongs to a specified number (e.g., five) of informations counted from the most recent one. If determined that the search date is recent (YES at S640), the road name redrawing process identifies the road name as a drawing target at S650, performs the redrawing process at S660, and then proceeds to S670. The redrawing process at S660 equals S630. If determined that the search date is not recent (NO at S640), the road name redrawing process skips S650 and S660 and proceeds to S670.

At S670, the road name redrawing process determines whether unprocessed road information remains. If determined that unprocessed road information remains (YES at S670), the road name redrawing process is repeated from S600. If determined that unprocessed road information is unavailable (NO at S670), the road name redrawing process terminates.

The process at S610 through S660 corresponds to a function of the drawing section 14 in the control circuit 10.

The following describes effects of the navigation system 1 according to the present embodiment.

According to the present embodiment, the process is supplied with the search condition such as "S Grand Ave, Los Angeles, Calif." (YES at S200 in FIG. 5) as described above. The process acquires road name "S Grand Ave" corresponding to search target spot X (S300 in FIG. 6). The process searches the display map dataset 21 for character data 21c (S310). The process acquires the scale for the display map dataset 21 corresponding to the character data 21c that contains the targeted road name (S320 and YES at S330). The scale is used to perform the map drawing process (S340). To draw a map containing the search target spot, the process previously searches the display map dataset 21 for the character data 21c so as to display the road name corresponding to the search target spot. The process uses the display map dataset 21 whose scale allows the character data 21c to contain the road name. The process thereby displays the appropriate road name of the road corresponding to the search target spot.

According to the present embodiment, the character data 21c in the display map dataset 21 may not contain road name "S Grand Ave" corresponding to search target spot X (NO at S320 in FIG. 6). In this case, the process searches the road name dataset 22 (S350) and specifies data for the road corresponding to road name "S Grand Ave" (S360). The process acquires a scale for display map dataset 21 containing data for the specified road (S370). The process uses this scale to perform the map drawing process (S380) and draws the road name by independently adding it (S390). The storage portion 20 also stores the road name dataset 22 that associates the road name with the road data 21a in the display map dataset 21. The determination section 13 may determine that the character data 21c in the display map dataset 21 does not contain the road name. In this case, the drawing section 14 draws a map containing the search target spot using the display map dataset 21 whose scale allows the road data 21a to contain the road corresponding to the road name based on the road name dataset 22. The drawing section 14 draws the road name by independently adding it to a road specified by the data for the road. As a result, a proper road name can be displayed for the road corresponding to the search target spot even if character data 21c does not contain the road name corresponding to the search target spot.

The present embodiment draws a road name by independently adding it according to the same display style as that used to draw a road name based on the character data 21c. Specifically, the font type, size, color, or the like is configured to equal that based on the character data 21c. This makes it impossible to seemingly distinguish whether a road name is drawn based on the character data 21c or by independently adding it. The drawing section 14 draws the road name of the road specified by the road data 21a by independently adding the road name so as to overlap the map to be drawn. In this case, the drawing section 14 uses the same display style as that used for drawing based on the character data 21c. The road name is drawn similarly to ordinary drawing based on the character data 21c while the road name is independently added for drawing. The user can be free from a feeling of strangeness.

According to the present embodiment, the character data 21c may contain the road name (S410, S420, and YES at S430 in FIG. 8) when the scale is changed. In this case, the map drawing process is performed (S440) to draw the road name based on the character data 21c. The road information acquisition section 12 acquires the road information when the scale is changed after the road name is drawn. The determination section 13 determines whether the character data 21c in the display map dataset 21 after the scale change contains the road name specified by the road information acquired by the road information acquisition section 12. If the character data 21c contains the road name based on a determination result from the determination section 13, the drawing section 14 draws a map containing the search target spot using the display map dataset 21 after the scale change. The road name is drawn based on the character data 21c even if the scale is changed. As a result, the road name is displayed appropriately for the road corresponding to the search target spot.

According to the present embodiment, the process searches the display map dataset 21 for the character data 21c after the scale change (S410 and S420 in FIG. 8). If the character data 21c does not contain the road name (NO at S430), the process searches the road data 21a for data corresponding to the road (S450). If the road data is available (YES at S460), the process specifies a road according to the data (S470). The process performs the map drawing process to draw the road (S480). The process draws the road name by individually adding it corresponding to the road (S490). The determination section 13 may determine that the character data 21c in the display map dataset 21 after the scale change does not contain the road name. Based on this determination result, if the road data 21a in the display map dataset 21 after the scale change contains the road corresponding to the road name, the drawing section 14 draws the road name by independently adding it to the road specified by the road data so that the road name overlaps the map to be drawn. The road name is displayed appropriately for the road corresponding to the search target spot even if the road name is not contained in the character data 21c in the display map dataset 21 after the scale change.

The present embodiment provides the input portion 40 capable of supplying search conditions. The control circuit 10 includes the search section 11 that searches the search dataset 23 to output a search result based on a search condition supplied from the input portion 40. The road information acquisition section 12 acquires road information based on at least one of a search condition supplied from the input portion 40 and a search result output from the search section 11 (S300 in FIG. 6). This enables to relatively easily acquire the road information to specify a road name corresponding to a search target spot.

The present embodiment draws a road name drawn in the past under a specified condition as well as a road name corresponding to the most recently retrieved search target spot. As described above, the storage portion 20 stores the road information as well as the search count and the search date (see FIG. 9). The control circuit 10 reads this road information and performs the redrawing process similarly to the above-mentioned scale change process (S630 and S660 in FIG. 10). The control circuit 10 includes the road information storage control section 15 that allows the storage portion 20 to store the road information. The road information acquisition section 12 acquires the road information in the past stored in the road information storage control section 15. The determination section 13 determines whether the character data 21c in the display map dataset 21 corresponding to a specified scale contains a road name specified based on the road information in the past acquired by the road information acquisition section 12. The character data 21c may contain the road name based on a determination result from the determination section 13. In this case, the drawing section 14 draws a map containing the search target spot using the display map dataset 21 corresponding to the specified scale. The character data 21c in the display map dataset 21 corresponding to the specified scale may not contain the road name based on a determination result from the determination section 13. In this case, the drawing section 14 draws a road name by independently adding it to the road specified by the road data so as to overlap the map to be drawn when the road data 21a in the display map dataset 21 corresponding to the specified scale contains the road corresponding to the road name. The road name drawn in the past can be redrawn. The road name is displayed appropriately for the road corresponding to the search target spot.

Figure 10:
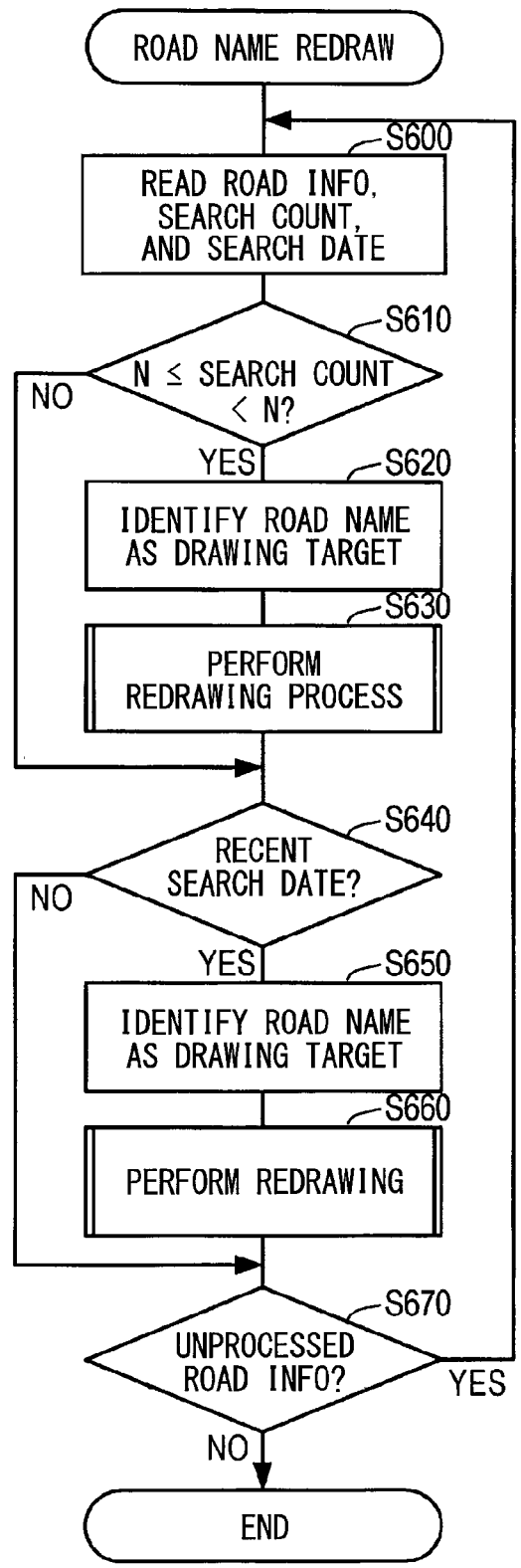
FIG. 10 is a flowchart illustrating a road name redrawing process.

Specifically, the search count may be greater than or equal to n (YES at S610 in FIG. 10). In this case, the road name redrawing process identifies the road name as a drawing target (S620). The road name redrawing process performs the redrawing process (S630). The road information storage control section 15 stores the road information and the number of times to search for the road specified by the road information. The road information acquisition section 12 acquires the road information from road information in the past in order to specify a road whose search count is greater than or equal to a predetermined lower limit. This enables to identify the positional relationship relative to the place interested in the past (the search target spot in the past) and easily determine whether the current search target spot is the intended one.

Specifically, the search count may be smaller than or equal to N (YES at S610 in FIG. 10). In this case, the road name redrawing process identifies the road name corresponding to the search target spot as a drawing target (S620). The road name redrawing process performs the redrawing process (S630). The road information acquisition section 12 acquires the road information from road information in the past in order to specify a road whose search count is smaller than or equal to a predetermined upper limit. The present embodiment does not display the place interested in the past (the search target spot in the past) that has been searched repeatedly. This is because such a place is highly likely to be familiar to the user. It is possible to prevent road names from being displayed complexly.

Specifically, the search date may be recent (YES at S640 in FIG. 10). In this case, the road name redrawing process identifies the road name corresponding to the search target spot as a drawing target (S650) and performs the redrawing process (S660). The road information storage control section 15 stores the road information and the search date for the road specified by the road information. Based on the search date, the road information acquisition section 12 acquires the road information from road information in the past. This enables to select a drawing target from relatively recent places interested in the past (search target spots in the past) and easily determine whether the current search target spot is the intended one.

Another embodiment may assume the number of places interested in the past (search target spots in the past) as possible drawing targets to be M or more. In such a case, all or part of the search target spots may be excluded from drawing targets. Namely, the road information acquisition section 12 may not acquire all or part of road information in the past as possible drawing targets if the road information exceeds a predetermined maximum count. Concerning a place that is most familiar to the user, for example, no road information is acquired and an ordinary map is displayed. In this case, for example, the road name redrawing process counts road information at S600 in FIG. 10. If the number of the road informations exceeds maximum value M, the road name redrawing process skips S610 through S670. This can shorten the time required to draw the map and improve the apparatus response.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A map display apparatus, comprising:
   a storage portion to store a plurality of display map datasets that include data as a drawing target, the plurality of display map datasets respectively corresponding to a plurality of map display scales; and
   a control circuit to draw a map containing a search target spot based on a display map dataset stored in the storage portion,
   the control circuit including
      a road information acquisition section that acquires road information to specify a target road name corresponding to a search target spot,
      a determination section to determine whether character data in a display map dataset contains a target road name specified by the road information acquired by the road information acquisition section, and
      a drawing section to draw a map containing the search target spot when the character data contains the target road name based on a determination result from the determination section,
      the map containing the search target spot being drawn by using, from among the plurality of display map datasets, a display map dataset that corresponds to a scale where the target road name is contained in the character data,
   wherein:
   the storage portion also stores a road name dataset to store a road name corresponding to road data in the display map datasets; and in cases that the character data in the display map datasets does not contain the target road name based on a determination result from the determination section, the drawing section draws a map containing the search target spot based on the road name dataset by using a display map dataset having a scale where a road corresponding to the target road name is contained in the road data, and simultaneously draws independently the target road name to a road specified by the road data to overlap the map that is drawn.

2. The map display apparatus according to claim 1, wherein when drawing the target road name by independently adding the target road name to the road specified by the road data, the drawing section uses a display style similar to a display style used in drawing based on the character data.

3. The map display apparatus according to claim 1, wherein:

the road information acquisition section acquires the road information when the scale is changed after the target road name is drawn;

the determination section determines whether character data in a display map dataset after scale change contains the target road name specified by the road information acquired by the road information acquisition section; and when the character data contains the target road name based on a determination result from the determination section, the drawing section draws a map containing the search target spot by using the display map dataset after scale change.

4. The map display apparatus according to claim 3, wherein, in cases that the character data in the display map dataset after scale change does not contain the target road name based on a determination result from the determination section, the drawing section independently draws the target road name to a road specified by the road data to overlap the map drawn when the road data in the display map dataset after scale change contains the road corresponding to the target road name.

5. The map display apparatus according to claim 1, further comprising:

an input portion capable of supplying a search condition, wherein:

the control circuit includes a search section that searches a search dataset and outputs a search result based on the search condition supplied from the input portion; and the road information acquisition section acquires the road information based on at least one of a search condition supplied from the input portion and a search condition output from the search section.

6. The map display apparatus according to claim 5, wherein:

the control circuit includes a road information storage control section that stores the road information in the storage portion;

the road information acquisition section acquires road information in a past stored in the road information storage control section;

the determination section determines whether character data in a display map dataset having a specified scale contains a target road name that is specified based on the road information in the past acquired by the road information acquisition section; and when the character data contains the target road name based on a determination result from the determination section, the drawing section draws a map containing the search target spot by using the display map dataset having the specified scale.

7. The map display apparatus according to claim 6, wherein, in cases that the character data in the display map dataset having the specified scale does not contain the target road name based on a determination result from the determination section, the drawing section independently draws the target road name to a road specified by the road data to overlap the map drawn when the road data in the display map dataset having the specified scale contains the road corresponding to the target road name.

8. The map display apparatus according to claim 6, wherein:

the road information storage control section stores the road information and a search count on a road specified by the road information; and the road information acquisition section acquires road information from the road information in the past to specify a road whose search count is greater than or equal to a predetermined lower limit.

9. The map display apparatus according to claim 8, wherein the road information acquisition section acquires road information from the road information in the past to specify a road whose search count is smaller than or equal to a predetermined upper limit.

10. The map display apparatus according to claim 6, wherein:

the road information storage control section stores a search date of a road specified by the road information together with the road information; and the road information acquisition section acquires the road information from the road information in the past based on the search date.

11. The map display apparatus according to claim 6, wherein the road information acquisition section does not acquire all or part of a plurality of the road informations in the past as a possible drawing target if a count of the road informations in the past exceeds a predetermined maximum value.

12. A navigation system comprising:

the map display apparatus according to claim 1; and a position detection portion to detect a current position of a vehicle.

13. A map display apparatus, comprising:

a storage portion to store a plurality of display map datasets, each display map dataset including road data and character data as a drawing target, the plurality of display map datasets respectively corresponding to a plurality of map display scales; and a control circuit to draw a map containing a search target spot based on one of the plurality of display map datasets corresponding to the respective map display scales stored in the storage portion, the control circuit including a road information acquisition section that acquires road information to specify a target road name corresponding to a search target spot, a determination section that determines whether character data in any one of the plurality of display map datasets corresponding to the respective map display scales contains the target road name specified by the road information acquired by the road information acquisition section as corresponding to the search target spot, and a drawing section that draws a map containing the search target spot using the one of the plurality of display map datasets corresponding to the respective map display scale which has the character data that contains the target road name, when the character data in the one of the plurality of display map datasets that corresponds to the respective map display scale is determined by the determination section to contain the target road name, the map containing the search target spot being drawn by using, from among the plurality of display map datasets, the one of the plurality of display map datasets that corresponds to a scale where the target road name is contained in the character data.

14. The map display apparatus according to claim 13, wherein:

the road information acquisition section acquires the road information when the scale is changed after the target road name is drawn;

the determination section determines whether character data in a display map dataset after scale change contains the target road name specified by the road information acquired by the road information acquisition section; and when the character data contains the target road name based on a determination result from the determination section, the drawing section draws a map containing the search target spot by using the display map dataset after scale change.

15. The map display apparatus according to claim 14, wherein, in cases that the character data in the display map dataset after scale change does not contain the target road name based on a determination result from the determination section, the drawing section independently draws the target road name to a road specified by the road data to overlap the map drawn when the road data in the display map dataset after scale change contains the road corresponding to the target road name.

16. The map display apparatus according to claim 13, further comprising:

an input portion capable of supplying a search condition, wherein:

the control circuit includes a search section that searches a search dataset and outputs a search result based on the search condition supplied from the input portion; and the road information acquisition section acquires the road information based on at least one of a search condition supplied from the input portion and a search condition output from the search section.

17. The map display apparatus according to claim 16, wherein:

the control circuit includes a road information storage control section that stores the road information in the storage portion;

the road information acquisition section acquires road information in a past stored in the road information storage control section;

the determination section determines whether character data in a display map dataset having a specified scale contains a target road name that is specified based on the road information in the past acquired by the road information acquisition section; and when the character data contains the target road name based on a determination result from the determination section, the drawing section draws a map containing the search target spot by using the display map dataset having the specified scale.

18. The map display apparatus according to claim 17, wherein, in cases that the character data in the display map dataset having the specified scale does not contain the target road name based on a determination result from the determination section, the drawing section independently draws the target road name to a road specified by the road data to overlap the map drawn when the road data in the display map dataset having the specified scale contains the road corresponding to the target road name.

19. The map display apparatus according to claim 17, wherein:

the road information storage control section stores the road information and a search count on a road specified by the road information; and the road information acquisition section acquires road information from the road information in the past to specify a road whose search count is greater than or equal to a predetermined lower limit.

20. The map display apparatus according to claim 19, wherein the road information acquisition section acquires road information from the road information in the past to specify a road whose search count is smaller than or equal to a predetermined upper limit.

21. The map display apparatus according to claim 17, wherein:

the road information storage control section stores a search date of a road specified by the road information together with the road information; and the road information acquisition section acquires the road information from the road information in the past based on the search date.

22. The map display apparatus according to claim 17, wherein the road information acquisition section does not acquire all or part of a plurality of the road informations in the past as a possible drawing target if a count of the road informations in the past exceeds a predetermined maximum value.

* * * * *